United States Patent [19]

Brown et al.

[11] Patent Number: 5,037,177
[45] Date of Patent: Aug. 6, 1991

[54] JOINTING OPTICAL FIBRE CABLES

[75] Inventors: Charles J. Brown, Harlow Essex; Richard K. Jones, Bishop's Stortford, both of Great Britain

[73] Assignee: STC PLC, London, England

[21] Appl. No.: 496,545

[22] Filed: Mar. 20, 1990

[30] Foreign Application Priority Data

Mar. 21, 1989 [GB] United Kingdom ............... 8906505

[51] Int. Cl.⁵ .............................................. G02B 6/38
[52] U.S. Cl. ........................................ 385/59; 385/100
[58] Field of Search ............ 350/96.20, 96.21, 96.23; 174/70 S

[56] References Cited

U.S. PATENT DOCUMENTS

| | | | |
|---|---|---|---|
| 4,332,435 | 6/1982 | Post | 350/96.20 |
| 4,359,262 | 11/1982 | Dolan | 350/96.20 |
| 4,619,499 | 10/1986 | Gerber | 350/96.20 |
| 4,657,343 | 4/1987 | Oldham et al. | 350/96.20 X |
| 4,687,289 | 8/1987 | DeSanti | 350/96.20 |

FOREIGN PATENT DOCUMENTS

| | | |
|---|---|---|
| 0067673 | 12/1982 | European Pat. Off. . |
| 2100465 | 12/1982 | United Kingdom . |
| 2102144 | 1/1983 | United Kingdom . |
| 2126368 | 4/1984 | United Kingdom . |
| 2157097 | 4/1984 | United Kingdom . |
| 2207255 | 1/1989 | United Kingdom . |
| 2224757 | 5/1990 | United Kingdom . |

Primary Examiner—Akm Ullah
Attorney, Agent, or Firm—Lee, Mann, Smith, McWilliams & Sweeney

[57] ABSTRACT

A joint assembly for an underwater optical fibre cable provides a limited-movement sliding clamp arrangement for the kingwire ends (9, 11). The sea casing provides the main tensile strength member of the joint and a split liner provides the main compressive strength of the joint. Tapered clamps (22, 12, 27) are incorporated into bulkheads of the joint assembly and coupled with ring nuts which screw into the sea casing and cause the bulkhead to abut the split liner. First and second parallel storage plates (1,5) store excess fibre and fibre splices.

5 Claims, 5 Drawing Sheets

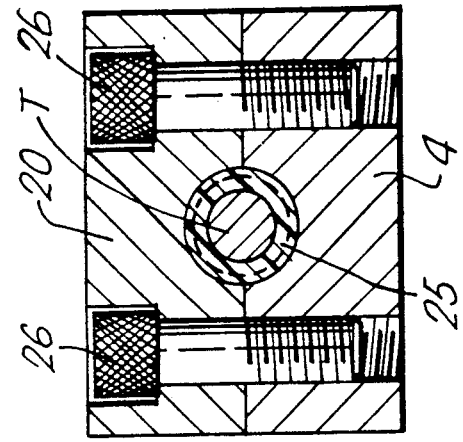
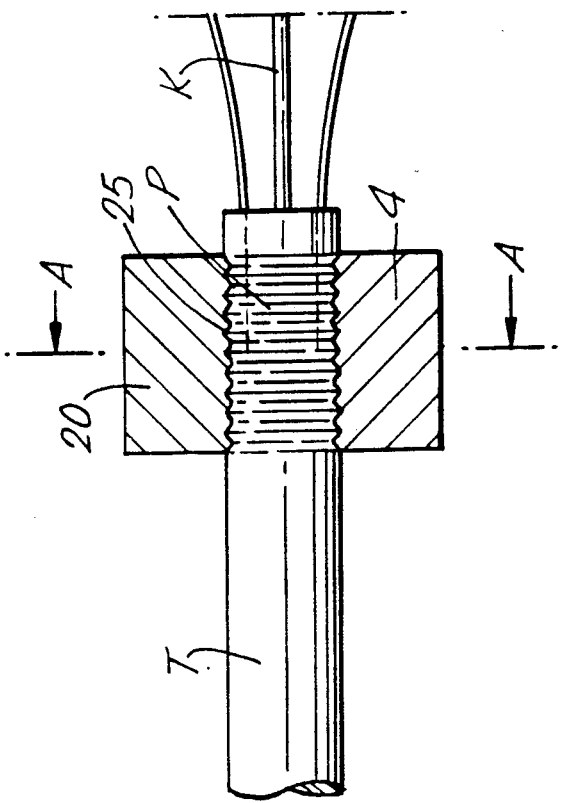

5,037,177

JOINTING OPTICAL FIBRE CABLES

BACKGROUND OF THE INVENTION

This invention relates to jointing optical fibre cables, particularly but not exclusively submarine optical fibre cables.

DESCRIPTION OF THE PRIOR ART

A known optical fibre cable joint is disclosed in European Patent Application No. 0067673 and is intended for submarine optical cables comprising several optical fibres surrounded by an annular-cross-section tensile strength member, generally made of wire strands.

Normally there are other layers such as a pressure resistant tube which lays beneath the strength member and which also can be electrically conductive to provide or assist in providing an electrical power feeding arrangement for repeaters, and an electrically insulating sheath around the strength member for insulating the electrically-conducting parts and providing protection.

It is an object of the present invention to provide an improved optical fibre cable joint which is easier to apply and which overcomes certain other problems associated with the earlier cable joint described above.

SUMMARY OF THE INVENTION

According to one aspect of the present invention there is provided an optical fibre cable joint comprising a first clamp for clamping to the tensile strength member of a first cable end, a second clamp for clamping to the tensile strength member of a second cable end, means for accommodating optical fibres from the respective cable ends and splices therebetween, means for coupling the first and second clamps and strong enough to withstand the tensile load in use of the jointed cables, and a jointing member for jointing the ends of a component part of each cable in such manner as to allow limited axial relative movement between the ends of said component parts within the cable joint.

This aspect is particularly useful where the component part is a kingwire in an optical fibre package of the cable, the limited axial relative movement minimising any possible deleterious effect of relative axial movement between the kingwire and the optical fibres of said package in the joint or in the vicinity thereof.

Preferably the jointing member for the component comprises first and second parts which fit together so that they can slide relative to each other in the axial direction of the cables being joined, by a amount limited by stops on said first and second parts.

According to a further aspect of the present invention there is provided a joint for ends of an optical fibre submarine cable having at least one optical fibre and a tensile strength member, the joint comprising a joint housing, connecting means for connecting the coupling member to the tensile strength members of the cables to be joined, the joint housing functioning as the tensile strength member of the joint and as the pressure resisting housing.

Preferably the joint comprises taper clamps for clamping to the tensile strength members of the respective cable ends, said clamps being themselves clamped between a split liner and a ring nut, said ring nut being screwed into a sea casing.

According to yet another aspect of the present invention there is provided a joint for optical fibre cables, each cable having at least one optical fibre package and a tensile strength member designed to provide at least a substantial part of the tensile strength the cable is required to have in use thereof, said joint comprising a coupling member, connecting means for connecting the coupling member to the tensile strength members of the cables to be joined and a clamp for clamping the optical fibre packages axially within the joint.

Where the optical fibre cables each have a package and a pressure tube around the package, then the joint preferably clamps both the package and the pressure tube axially of the cables.

BRIEF DESCRIPTION OF THE DRAWINGS

In order that the invention can be more clearly understood reference will now be made to the accompanying drawings in which:

FIGS. 2a and 2b shows schematically the pressure tube and package clamp of FIG. 1.

DESCRIPTION OF THE PREFERRED EMBODIMENT

Figure 1:
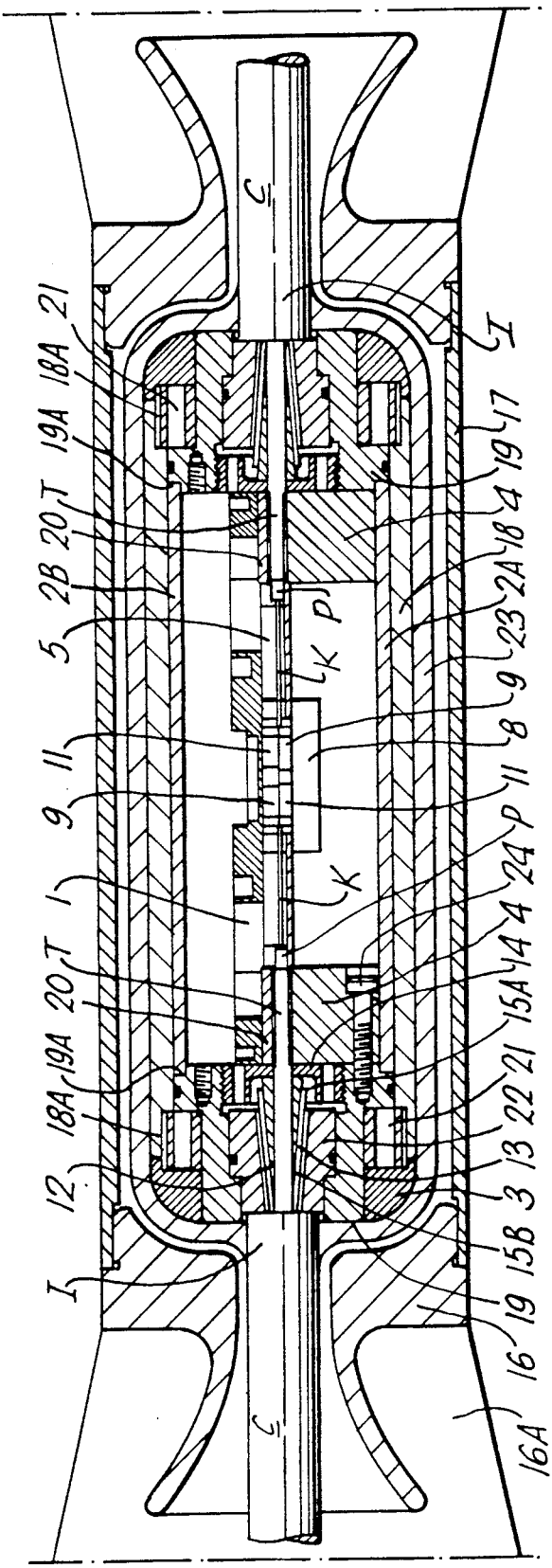
FIG. 1 shows in cross section an optical fibre cable joint according to an embodiment of the present invention.

Referring to FIG. 1 of the drawings there is shown first and second submarine optical fibre cables C1, C2 respectively entering from the left and from the right of the drawing as shown.

Each cable comprises an annular tensile strength member formed by first and second layers 15a and 15b and an optical fibre package P. Between the tensile strength member 15A, 15B and the package P is a pressure tube T comprising in this embodiment a C-section copper or aluminium tubular member which has been closed around the optical fibre package and hermetically sealed by welding the edges of the tube and/or by pacing the tube within a secondary tube to provide an hermetic seal. The package P has several optical fibres embedded in it and a central kingwire K.

The joint comprises a joint housing including a sea case 18. The sea case of the joint provides a pressure resistant housing and acts as the tensile strength member. A "split liner" arrangement is provided. The sea case acts as the pressure resisting housing and the tensile strength member, and a pair of split half shells or liners within the sea case support bulkheads at opposite ends. An advantage of this design is that the bulkheads are identical, and the sea case is not "handed" and can therefore be parked onto either cable end during assembly.

In FIG. 1, the sea case 18 is a sliding fit over a pair of liners 2A, 2B, the split lying at right angles to the Figure and containing the centre line C/L.

The two bulkheads 19 are held against the split liners 2A, 2B by retaining nuts 21 and each has an annular recess 19A into which the liners fit. The nuts 21 screw into internal threaded end portions 18A in the sea case 18.

Strand wire clamps (or terminations) each comprise a termination liner 22 an inner ferrule 12 and an intermediate liner 13. A retaining nut 14 retains the ferrule after pressing.

A metal buffer part 16 has a rubber buffer 16A moulded to it and is secured to a buffer tube 17. Around the sea case 18 is a polythene moulding 23 which amalgamates with the insulator I of the cable ends. Profiled end caps 3 screw onto a portion of ring nut 21 left projecting and provide a smooth contour at the ends of the sea casing for the polythene moulding operation.

Inside the joint housing the pressure tube 7 and package P are clamped between top clamp part 20 and bottom clamp part 4 which is secured to the respective bulkhead 19 by screws such as 24 (not shown in right hand assembly). The fibre package P has a "build-out" tubing applied so that its outside diameter is the same as the pressure tube T so that a single diameter clamp design can be applied to clamp both the tube and the package axially of the joint to prevent axial movement of the part of the cable relative to the strand wires and bulkhead.

FIG. 2 shows this clamp schematically where the top and bottom parts 20 and 4 (schematic representation only) have a screw threaded or serrated cylindrical profile 25 which bites into the surface of the tube T and the build-out tubing (conventionally heat-shrink tubing) so the heat shrink tubing prevent damage to or microbending losses in the fibres within the package by acting as a buffer therebetween.

Screws 26 hold the clamp parts 20 and 4 together.

The kingwires K are clamped in a limited-movement clamp at the centre of the joint. This is shown more clearly in FIG. 4. An electrically insulating mounting plate 8 carries clamp assemblies 11A and 11B. Assembly 11A is fixed, but 11B can slide axially of the joint by a limited amount only so that movement of the kingwires towards each other is allowed when elastic compression of the liners 2A, 2B occurs due to hydrostatic end loads on bulkhead. The degree of movement is less than that allowed by the clamp so that compressive forces do not build up at the ends of the kingwires otherwise the kingwire may buckle in the joint and cause microbending in the fibre package where the fibres emerge from the package.

Clamp is assembled in tension mode i.e. no sliding occurs on application of tension. When the joint is under tensile load the stops 11C and 11D engage each other and support the tensile load in the kingwires K. Electrical continuity is required through the kingwire clamps and so a conductive wire W of meander shape electrically bridges the clamp.

Screw 10 holds the parts 9, 11A, 9, 11B together. Part 11B slides axially in a recess in the mounting plate 5, and in the splice storage plate 1 which lies over it. The plate 8 is mounted on the fibre storage plate 5, which is fixed to the left hand bulkhead 19, but which can slide by a limited amount relative to the right hand bulkhead 9. So when pressure is applied axially to the housing plate 5 is not put under compression.

Figure 5:
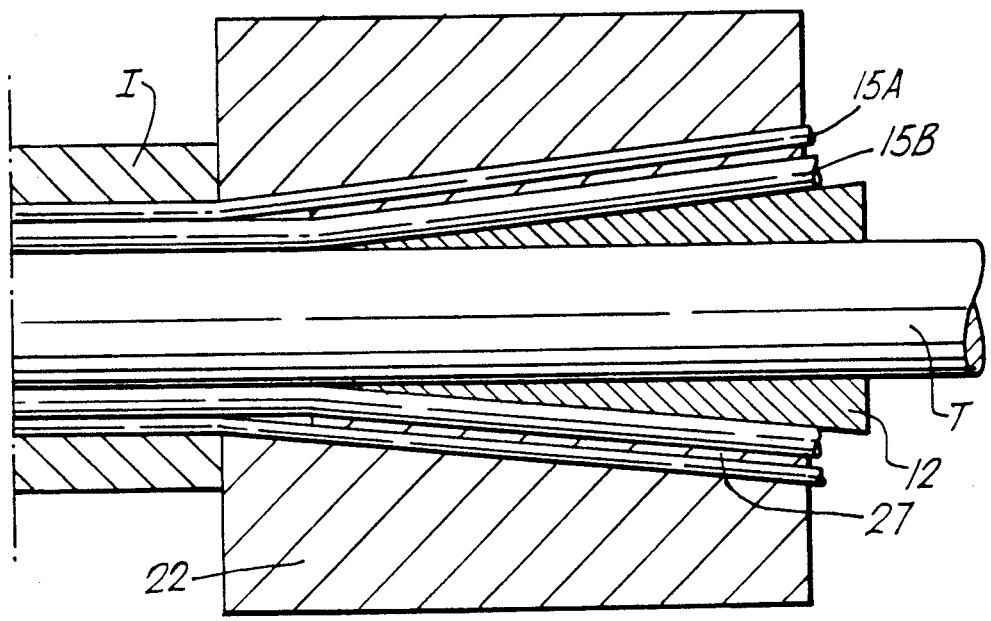
FIG. 5 shows again schematically but in axial section, the tapered clamp termination for the strand wires of FIG. 1.

FIG. 5 shows schematically one of the strand wire terminations and is similar to our published British Patent Application No. 2224757.

Tapered ferrule 12 is hydraulically pressed into the liner 22 with a tapered intermediate sleeve 27 lying between the strand wire layers to prevent damage where they cross over and maximise the active grip length of the wires. As the cut ends of the wires are accessible at the low tension side of the termination, it is possible to ensure evenly spaced wires prior to pressing the ferrule home. Furthermore, subsequent to the pressing operation the wire ends can be inspected to ensure equal spacing and therefore an even load distribution has been achieved.

It is understood that FIG. 5 is somewhat schematic sufficient to show the principles involved but omit some of the detail visible in FIG. 1.

Referring back to FIG. 1, the fibres are stored in a lower fibre storage plate 5 and the end portions of the fibres and the splices therebetween are stored in an upper splice storage plate 1.

Figure 6:
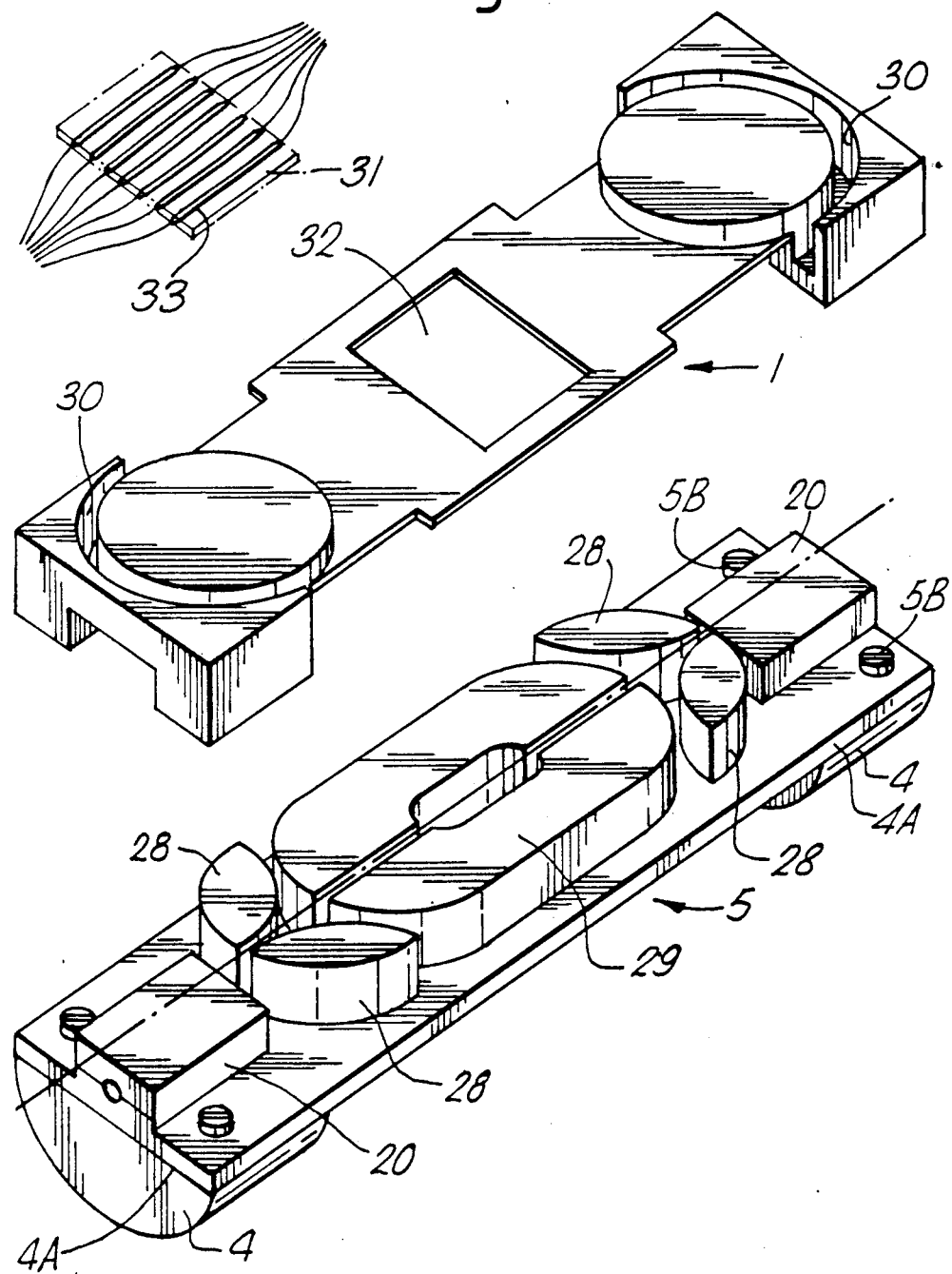
FIG. 6 is an exploded view of the fibre storage and splice storage plates of FIG. 1

Plate 5 is screwed by screws 5A to the upper surfaces 4A of lower clamp parts 4 (it can slide about 1 mm with respect to right hand part 4 via slots 5B) and the emerging fibres are laid in channels, defined between raised lands 28 and 29 as shown more clearly in FIG. 6 which is an expanded view of the fibre and splice storage plates.

Figure 7:
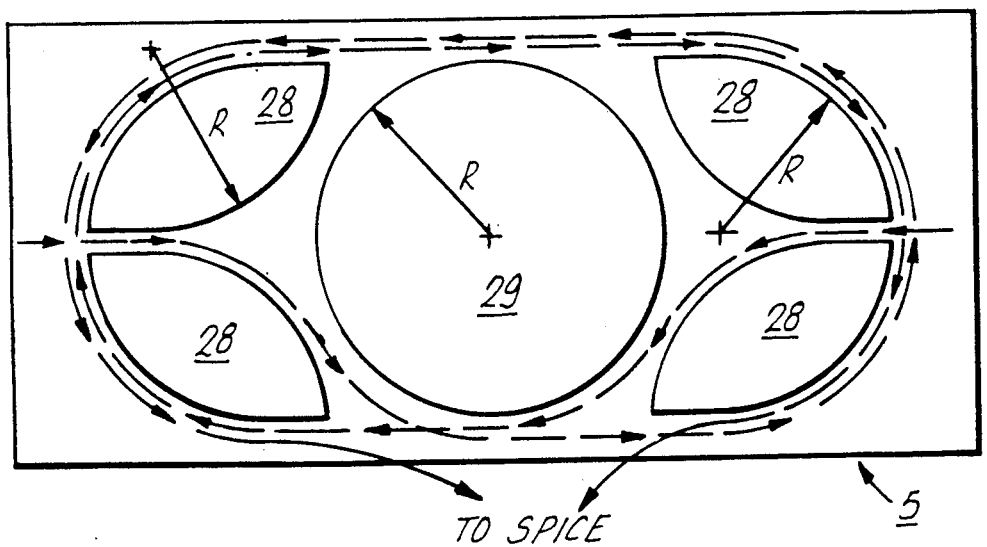
FIG. 7 is a plain view of the fibre storage and routes to the splice plate, of FIG. 1.

FIG. 7 shows diagrammatically the route followed by the incoming fibres and it should be noted that the raised land 29 is the same in both FIGS. 6 and 7 although it is shown elongate in FIG. 6 and circular in FIG. 7. Either shape will suffice.

Where the fibres emerge "to splice" (FIG. 7) they proceed from the lower plate to the upper plate via channels 30 in the upper plate. The splices are stored in a holder 31 which fits in an aperture 32 in the splice storage plate 1. Splices are indicated at 33.

Figure 4:
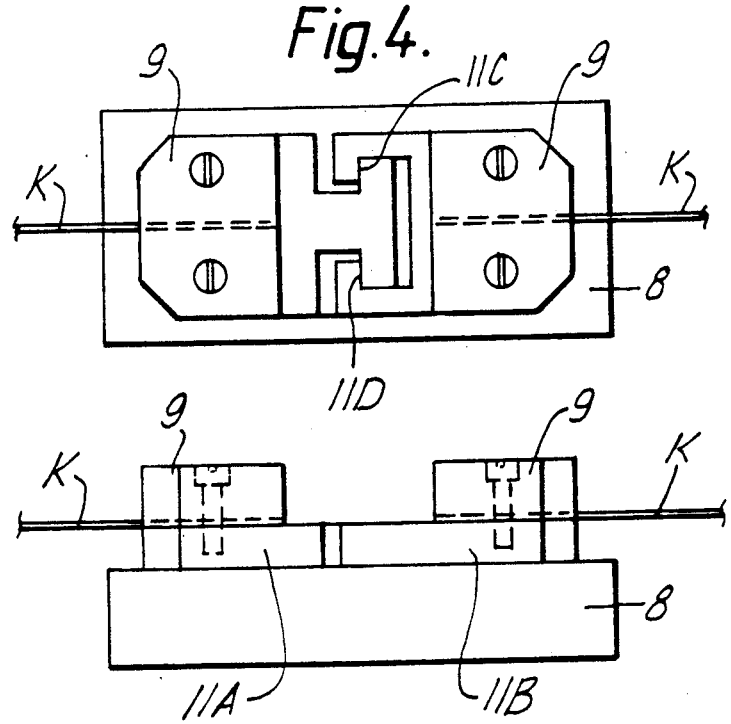
FIG. 4 is a perspective view of the kingwire termination of FIG. 1.

In the raised land 29 there is a recess 34 to accommodate the kingwire termination shown in FIGS. 1 and 4.

To assemble the cable joint shown in the accompanying figures, first the sea case 18 and bulkheads 19 and buffers are parked on the appropriate cable ends. Then the cable ends are prepared and the strand wire terminations are assembled. The pressure tube T is cut back to the right length and the plastics encapsulation of the optical fibres package, in this embodiment a plastic sold under the trade name Hytrel, is stripped away using a stripping technique as disclosed in our published British patent application No. 2207255.

The pressure tube T and the package are then terminated in the package and tube clamp parts 4 and 20. Then the lower half (item 4) of each clamp is secured to the bulkhead at one side only.

It is then necessary to put splice reference marks on the fibres according to a discrete length which represents one complete path around the raised lands on the fibre storage plate shown in FIGS. 6 and 7. Then the fibre storage plate is fitted to the part 4 which has been secured to the bulkhead and following this the other end of the fibre storage plate is fitted to the other part 4 of the corresponding strand termination on the other side of the joint.

The free optical fibres are then "ordered" around the kingwires at both ends to ensure regular orientation and then the kingwires are clamped in the kingwire termination at the centre of the joint and this is located in the recess 34. It is important that the kingwire termination is assembled in tension mode while the left hand kinwire termination is fixed to the storage plate and the left hand end of the storage plate is fixed to the associated bulkhead. Then the right hand end of the storage plate is allowed to have limited sliding movement relative to the right hand termination part 4.

Then the fibres from one cable end are spliced to the fibres of the other cable end and the splice storage plate 1 is then assembled onto the lower fibre storage plate 5.

Small pads of foam rubber are applied into the channels between the raised lands in order to trap the fibres and ensure that they do not spring out as the upper plate is fitted into place. The splice holder supporting the various splices is then secured into the splice holder aperture 32.

The two split shells 2A and 2B are then located in place after the complete optical fibre assembly has been visually inspected and tested, followed by the sea case 18 which is slid into place and the locking nuts 21 are screwed into the sea case to lock the bulkheads against the ends of the split shells.

As shown in FIG. 1 of the drawings there are various O-rings to provide sealing of the joint assembly.

The locking nuts are screwed up to a torque of about 50 Nm and then the profiuled end pieces 3 are screwed into place on the locking nuts to provide a smooth end contour for the sea case.

The assembled joint is then placed into a moulding station in which a polyethelyne over mould using a ring-gague injection moulding apparatus is applied. The buffer mouldings 16, 16A are slid onto the joint and the buffer tube 17 is secured thereto thereby completing the joint.

If the cable are armoured cables, then armouring terminations would be made over the joint using terminations as described in our granted British patent No. 2147243. If the cable is unarmoured but is screened with a screening polyethylene aluminium laminate (not shown) then a continuity wire is applied over the polythene over moulding but beneath the buffers in order to provide electrical continuity from the screen of one cable to the screen of the other cable.

Figure 3:
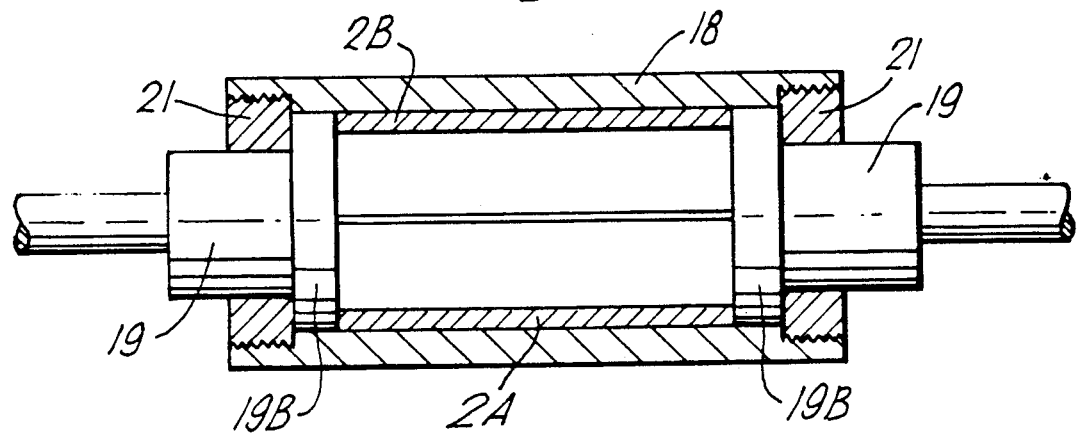
FIG. 3 shows schematically the principles of construction of the joint housing and bulkheads of FIG. 1.

When deep sea pressure is applied to the jointed cables as described above, elastic compressive strain causes shortening of the housing by a fraction of a millimeter so the kingwire termination allows axial movement so as to prevent compressive forces being applied to the kingwire within the joint and in the vicinity of the optical fibre package. With this arrangement the sea casing takes the tensile and radial forces applied during deep sea operation, whereas the split liners take the axial compressive forces of the joint. This is shown more clearly in FIG. 3 of the drawings which is a schematic representation of the construction of the joint. The top and bottom split liners are under very little axial compression when the joint is assembled but become under increasing axial force as deep sea pressure is applied to the opposing bulkhead terminations. The sea case as can be seen, takes the radial pressure of the ocean depths and also withstands the axial loads imposed on the cable during laying and recovery operations via the retaining rings 21 and the shoulders 19B in the bulkheads 19.

What is claimed is:

1. A joint assembly for jointing first and second ends of an optical fibre submarine cable having a plurality of optical fibres and a tensile strength member, the joint assembly comprising: a first bulkhead for clamping to the tensile strength member of the first end; a second bulkhead for clamping to the tensile strength member of the second end; a sea casing having first and second ends, coupling means for coupling the first and second bulkheads to respectively the first and second ends of the sea casing in a pressure-tight manner so that said casing takes up the tensile load applied to the cable in use thereof; and compression-resisting means fitting against said first and second bulkheads and able to resist the underwater pressure urging the bulkheads towards each other in use of said joint assembly underwater; and storage means for storing excess lengths of said optical fibres and splices in said fibres.

2. A joint assembly as claimed in claim 1, wherein the compression-resisting means comprises a split liner which lies inside of and adjacent to the sea casing, said coupling means comprising first and second ring nuts which screw into respective first and second ends of the sea casing.

3. A joint assembly as claimed in claim 1, said means comprising a first fibre storage plate defining channels for storing excess fibre extending from said first and second cable ends, means for mounting the first plate on one of said first and second bulkheads, and a second storage plate having means for storing splices between ends of said excess fibre, and means for mounting said second storage plate parallel to the first storage plate.

4. A joint assembly as claimed in claim 1, wherein the cable has an optical package including a kingwire, comprising a limited-movement clamp, means for mounting the clamp within the assembly, said clamp comprising a first clamp assembly for clamping to the kingwire of one cable end, and a second clamp assembly for clamping to the king wire of the second cable end, one clamp assembly having means to fix it relative to the joint assembly and the other clamp assembly being mounted to slide by a limited amount relative to the one clamp assembly whereby to accommodate limited relative movement of the kingwires within the joint assembly.

5. A joint assembly as claimed in claim 1, said cable having a pressure tube around a fibre package, said joint assembly having a pressure tube clamp and a package clamp for respective cable ends.

* * * * *